(12) United States Patent
Wunderlich et al.

(10) Patent No.: US 12,301,038 B2
(45) Date of Patent: May 13, 2025

(54) DEVICE FOR OPERATING AN ELECTRONIC SYSTEM OF A VEHICLE

(71) Applicant: Vitesco Technologies GmbH, Regensburg (DE)

(72) Inventors: Andreas Wunderlich, Wenzenbach (DE); Alfons Fisch, Falkenstein (DE); Aurore Desgeorge, Tournefeuille (FR)

(73) Assignee: Vitesco Technologies GmbH, Regensburg (DE)

( * ) Notice: Subject to any disclaimer, the term of this patent is extended or adjusted under 35 U.S.C. 154(b) by 292 days.

(21) Appl. No.: 17/808,707

(22) Filed: Jun. 24, 2022

(65) Prior Publication Data
US 2022/0329077 A1    Oct. 13, 2022

Related U.S. Application Data

(63) Continuation of application No. PCT/EP2020/084840, filed on Dec. 7, 2020.

(30) Foreign Application Priority Data

Jan. 9, 2020   (DE) .................... 10 2020 200 203.7

(51) Int. Cl.
*B60R 16/00* (2006.01)
*B60R 16/033* (2006.01)
*H02J 7/00* (2006.01)

(52) U.S. Cl.
CPC ............ *H02J 7/007* (2013.01); *B60R 16/033* (2013.01); *H02J 7/0063* (2013.01)

(58) Field of Classification Search
None
See application file for complete search history.

(56) References Cited

U.S. PATENT DOCUMENTS 5,473,201 A * 12/1995 Gantenbein ............. G05F 1/468
                                                           307/10.6
6,138,059 A    10/2000 Ozeki et al.
(Continued)

FOREIGN PATENT DOCUMENTS

CN            1963707 A      5/2007
DE       102005041895 A1     3/2007
(Continued)

OTHER PUBLICATIONS

Machine translation of DE102013210868 (Year: 2014).*
(Continued)

*Primary Examiner* — James M McPherson

(57) ABSTRACT

The disclosure provides a device for operating an electronic system. The device includes a power supply unit that, during operation, provides a supply voltage on a supply potential output. The power supply unit has an enable input via which the supply voltage can be enabled and disabled by an enable signal. In a power-latch phase of the electronic system in which the enable signal is not present, the power supply unit provides the supply voltage upon receiving a trigger signal even when the enable signal is not present. The device includes a microcontroller supplied with the supply voltage on a second supply potential input connection when the enable signal is present or when the microcontroller, in the power-latch phase, generates the trigger signal and transmits it to the trigger signal input. Upon receiving a control command, the power supply unit suppresses deactivation of the supply voltage for supplying the microcontroller.

10 Claims, 2 Drawing Sheets

(56) References Cited

U.S. PATENT DOCUMENTS

| | | | |
|---|---|---|---|
| 6,357,012 B1 * | 3/2002 | Aab | G06F 1/324 |
| | | | 713/323 |
| 2008/0033626 A1 | 2/2008 | Marenco | |
| 2008/0262683 A1 * | 10/2008 | Ward | H01H 47/002 |
| | | | 701/51 |
| 2013/0091323 A1 | 4/2013 | Kanamori | |
| 2013/0285445 A1 | 10/2013 | Haug | |
| 2018/0189045 A1 | 7/2018 | Dalke | |
| 2021/0034134 A1 * | 2/2021 | Yu | B60L 1/00 |

FOREIGN PATENT DOCUMENTS

| | | |
|---|---|---|
| DE | 102009017910 A1 | 10/2010 |
| DE | 102009038434 A1 | 2/2011 |
| DE | 102012204635 A1 | 10/2012 |
| DE | 102013210868 A1 | 12/2014 |

OTHER PUBLICATIONS

International Search Report and Written Opinion dated Dec. 7, 2020 from corresponding International Patent Application No. PCT/EP2020/084840.

German Office Action dated Oct. 13, 2020 for corresponding German Patent Application No. 10 2020 200 203.7.

Chinese Office Action dated Nov. 29, 2024 or corresponding Patent Application No. 202080092344.3.

* cited by examiner

DEVICE FOR OPERATING AN ELECTRONIC SYSTEM OF A VEHICLE

CROSS-REFERENCE TO RELATED APPLICATIONS

This application claims the benefit of PCT Application PCT/EP2020/084840, filed Dec. 17, 2020, which claims priority to German Application 10 2020 200 203.7, filed Jan. 9, 2020. The disclosures of the above applications are incorporated herein by reference.

TECHNICAL FIELD

The disclosure relates to a device for operating an electronic system. In particular, the disclosure relates to a device for operating an electronic system of a vehicle.

BACKGROUND

Electronic systems, such as in a vehicle, typically includes a microcontroller designed to provide a control signal for a load. The microcontroller is powered by a power supply unit of the electronic system, which in operation is supplied with a battery voltage at a supply potential connection and which provides a supply voltage for the microcontroller at a supply potential output connection. The electronic system can be switched on and off via an enable input. More precisely, the supply voltage at the supply potential output connection is enabled or disabled by means of the enable signal.

When the enable signal is deactivated, the so-called power-latch phase of the electronic system begins. The power-latch phase is often used by the microcontroller to perform diagnostics. To this end, by way of a cyclically emitted trigger signal the power supply unit is caused to maintain the supply voltage at the supply potential output connection until the trigger signal is cleared. The trigger signal includes pulses cyclically generated by the microcontroller. This concept is also known as the "power latch concept".

A reset in the power-latch phase leads directly to the supply potential output connection being switched off, firstly because the state machine uses this as a shutdown condition, and secondly, because the trigger signal can no longer be generated. In order to be able to carry out fault response tests in the power-latch phase, which ultimately trigger a reset, a different approach is required.

SUMMARY

The disclosure provides a device for operating an electronic system, such as of a vehicle, which allows a functionally improved way of carrying out fault response tests in the power-latch phase of an electronic system. For example, an unwanted supply voltage shutdown of the microcontroller in the power-latch phase of the electronic system is to be suppressed.

A device for operating an electronic system is described. The electronic system can be any technical system, such as of a vehicle.

The device includes a power supply unit that, during operation, is supplied with a battery voltage on a first supply potential input connection and that provides a supply voltage on a supply potential output connection. The battery voltage and the supply voltage may have the same voltage level. However, the power supply unit can also include one or more voltage regulators, so that a lower supply voltage is generated from the battery voltage.

The power supply unit has an enable input, via which the supply voltage on the supply potential output connection can be enabled and disabled. For this purpose, the enable signal has two signal states, where in a first signal state, e.g., logical "H", the supply voltage on the supply potential output connection is enabled, and logical "L", in which the supply voltage on the supply potential output connection is disabled. Depending on the implementation of the power supply unit, enabling or disabling of the supply voltage on the supply potential output connection can also be implemented with the signal states reversed.

The power supply unit also includes a trigger signal input to receive a trigger signal. The power supply unit is designed, during a power-latch phase of the electronic system in which the enable signal is not present, to provide the supply voltage on the supply potential output connection upon receipt of the trigger signal, even when the enable signal is not present. The term "trigger signal" here is understood to mean a signal with cyclically generated signal pulses. The term "upon receipt of the trigger signal" is to be understood to mean "as long as the trigger signal is being received".

The device also includes a microcontroller. In a known manner, the microcontroller is used to generate at least one control signal, which is provided at a control output of the microcontroller to process a load. The load can be a switching element, a safety-relevant or non-safety-relevant control function, another control unit, or the like. The supply voltage is supplied to the microcontroller at a second supply potential input connection. On the one hand, the supply voltage is supplied when the enable signal is present at the enable input. On the other hand, the supply voltage is supplied to the microcontroller when the microcontroller generates the trigger signal in the power-latch phase and transmits it to the trigger signal input of the power supply unit.

In order to be able to carry out fault response tests, for example in the power-latch phase, which also cause a reset of the microcontroller and the power supply unit in the power-latch phase and thus interrupt the issuing of the trigger signal, the power supply unit is also designed to suppress deactivation of the supply voltage for supplying the microcontroller upon receipt of a specified control command.

The present device enables the deactivation of the supply voltage on the supply potential output connection to be suppressed by means of specified control commands, and thus the power supply to the microcontroller to be maintained. This makes it possible, for example, to perform fault response tests which also cause the microcontroller to reset, so that the microcontroller can restart after the reset is complete. If the microcontroller generates the trigger signal again after its restart, it can automatically ensure that the power supply is maintained, independently of the specified control command.

This makes it possible to operate the electronic system in the power-latch mode for most of the time. Due to the ever-increasing complexity of software routines running on the microcontroller and a more complex architecture of the microcontroller, the increasing probability of resets in this phase can be allowed for.

In some implementations, the microcontroller is designed to issue the control command. The control command is issued by the microcontroller, for example, when the latter has received an enable signal from the power supply unit announcing the deactivation of the enable signal.

In some examples, the power supply unit is designed to suppress the deactivation of the supply voltage for a specified period of time following the receipt of the control command. For example, to this end the power supply unit can start a timer from the time at which the control command is received. The time period after which the timer expires can be fixed in the power supply unit. For example, the specified time period can range from a few hundred milliseconds to a few seconds, the actual duration depending on the fault response tests and/or other tasks to be performed by the microcontroller.

In some implementations, the power supply unit is designed to restart the specified time period since the receipt of a respective control command. This enables the microcontroller to restart the timer, e.g., by calling a new fault response test. This ensures that the voltage supply for the microcontroller is ensured even if there is a large number of tests to be carried out.

In some examples, the power supply unit is designed to suppress the deactivation of the supply voltage for supplying the microcontroller after receiving the control command, independently of the absence of the trigger signal. In other words, the response generated by the control command dominates the received trigger signal.

In some implementations, the power supply unit is designed to suppress the deactivation of the supply voltage for supplying the microcontroller after receiving the control command, even if no enable signal is present at the enable input. The control command also exhibits a dominant behavior in relation to this state of the electronic system/the power supply unit, so that the power supply of the microcontroller is guaranteed in every case.

In some examples, the power supply unit is designed to suppress the deactivation of the supply voltage for supplying the microcontroller after receiving the control command, even if the power supply unit undergoes a reset.

In some implementations, the microcontroller is designed to increment or decrement a counter by 1, starting from a specified counter start value, with each call of a control command. If the counter has reached a specified counter end value, the control command is no longer issued. This can prevent improper use or incorrect behavior, for example of a fault response test, as the frequency of the command call can be limited to ensure the power supply of the microcontroller. For example, the counter start value can be 0, where with each call a counter is incremented by 1 up to a counter end value that is greater than 0. For example, the counter start value can also be decremented by 1 from a positive starting value down to 0, for example, as a counter end value.

In some implementations, the microcontroller is designed to call the control command once or cyclically or indefinitely. Which of these variants is ultimately selected depends on the implementation of the routines running on the microcontroller in the power-latch phase.

In some examples, the frequency of the limitation of the command call is not monitored in the microcontroller but in the power supply unit. The power supply unit is designed to increment or decrement a counter by 1, starting from a given counter start value, upon each receipt of a control command, where if the counter has reached a specified counter end value, the deactivation of the supply voltage for supplying the microcontroller is not suppressed.

In some implementations, the power supply unit includes a control unit which is designed to generate, upon receipt of the control command, a control signal for a controllable switching unit which is connected to the first supply potential input connection for switching the battery voltage. For example, the switching unit can be a main relay that is used to supply the battery voltage to the first supply potential input connection. The control unit keeps the control signal output active during the reset so that the switching unit remains in a conducting state.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
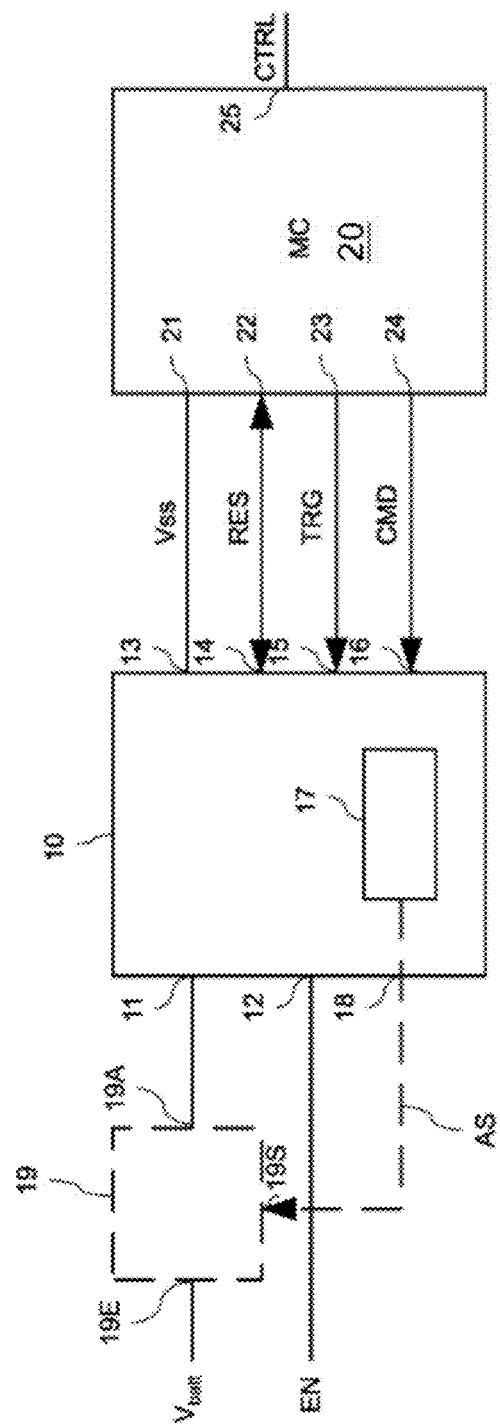
FIG. 1 shows a schematic illustration of an electronic system in which a power supply unit can be used to suppress the deactivation of functional components in a targeted manner.

FIG. 1 shows a schematic illustration of a part of an electronic system, where only the components necessary for understanding the disclosure are shown. The electronic system may be, for example, an electronic system of a vehicle, e.g., for a partially, highly or fully autonomous driving function for a transverse and/or longitudinal movement of the vehicle. The technical system can also be located in other technical domains.

Such an electronic system includes a power supply unit 10 for supplying the components contained in the electronic system, a microcontroller 20 for controlling and/or monitoring loads to be controlled, and one or more loads (not shown). In the timing diagram of FIG. 2, this is labeled with PWR=ON, i.e., the power supply (power PWR) is active.

The power supply unit 10 is supplied with a battery voltage Vbatt via a first supply potential input connection 11. The battery voltage Vbatt can be fed to the first supply potential connection 11 directly or via an optional switching unit 19, e.g., a relay or contactor. If such an optional switching unit 19 is provided, a first main connection 19E is connected to a supply voltage terminal (not shown) and a second main connection 19A is connected to the first supply potential input connection 11. The optional switching unit 19 is supplied via a control connection 19S with a control signal AS which switches the switching element 19 into a conducting or blocking state. The corresponding control signal is provided at a control signal output 18 of the power supply unit 10 and generated by a control unit 17 of the power supply unit 10.

The power supply unit 10 provides a supply voltage Vss at a supply potential output connection 13, with which voltage the microcontroller 20 and any other electrical components present are supplied with voltage. The supply voltage Vss can correspond to the battery voltage Vbatt. The power supply unit 10 often contains one or more voltage regulators that convert the battery voltage Vbatt into a lower supply voltage Vss. The voltage regulators can be designed as linear or SMPS (Switched Mode Power Supply) regulators.

An enable signal EN is supplied to the power supply unit 10 via an enable input 12. The enable signal EN can be used to enable and disable the supply voltage Vss at the supply potential output connection 13. In a motor vehicle, the enable signal EN is derived, for example, from the terminal 15 (ignition on or off). For example, if the enable signal EN has a logical "H", the power supply unit 10 provides the supply voltage Vss at the supply potential output connection 13, which causes the microcontroller 20 to be supplied with the supply voltage Vss at a second supply potential input connection 21. In addition, a reset signal RES is used to signal to the microcontroller 20 that the supply voltage Vss has stabilized. For this purpose, the power supply unit 10 has an enable output 14, which is connected to communicate with an enable input 22 of the microcontroller 20. If the enable signal EN has a logical "L", the supply voltage Vss at the supply potential output connection 13 is disabled. Deactivating the enable signal EN initiates the so-called power-latch phase (PWR=PWL, see FIG. 2).

To prevent an immediate shutdown of the power supply unit 10 or the microcontroller 20, the microcontroller 20 is configured to generate a trigger signal TRG and transmit it to the power supply unit 10. For this purpose, the microcontroller 20 has a trigger signal output 23, which is connected to communicate with a trigger signal input 15 of the power supply unit 10. The term "trigger signal" here is understood to mean a signal with cyclically generated signal pulses.

As long as the power supply unit 10 receives the trigger signal TRG even if the enable signal EN is not present (i.e. EN="L"), the power supply unit 10 continues to provide the supply voltage Vss at the supply potential output connection.

If the electronic system is in the power-latch phase, i.e., PWR=PWL, i.e., the enable signal EN is logical "L", it then depends on the presence or absence of the trigger signal TRG whether the microcontroller 20 continues to be supplied with the supply voltage Vss or not. Since the microcontroller performs so-called fault response tests in the power-latch phase, which due to a reset of the microcontroller 20 cause an interruption of the TRG trigger signal at the end of the reset performed, a restart of the microcontroller 20 might no longer be able to be performed, since the power supply unit 10 disables the supply voltage Vss at the supply potential output 13 if the trigger signal TRG is not present.

In order to prevent this, the power supply unit 10 is designed to suppress the deactivation of the supply voltage Vss for supplying the microcontroller 20 on receiving a control command CMD issued by the microcontroller 20, and this happens even if the trigger signal TRG is no longer received at the trigger signal input 15. The control command CMD is transmitted between a command signal output 24 of the microcontroller 20 and a command signal input 16 of the power supply unit 10.

Although as described above the enable signal RES, the trigger signal TRG and the control command CMD are transmitted via different signal lines, it is clear to the person skilled in the art that these could also be transmitted via a common input/output interface of the power supply unit 10 or of the microcontroller 20 and via a single (bus) line.

Figure 2:
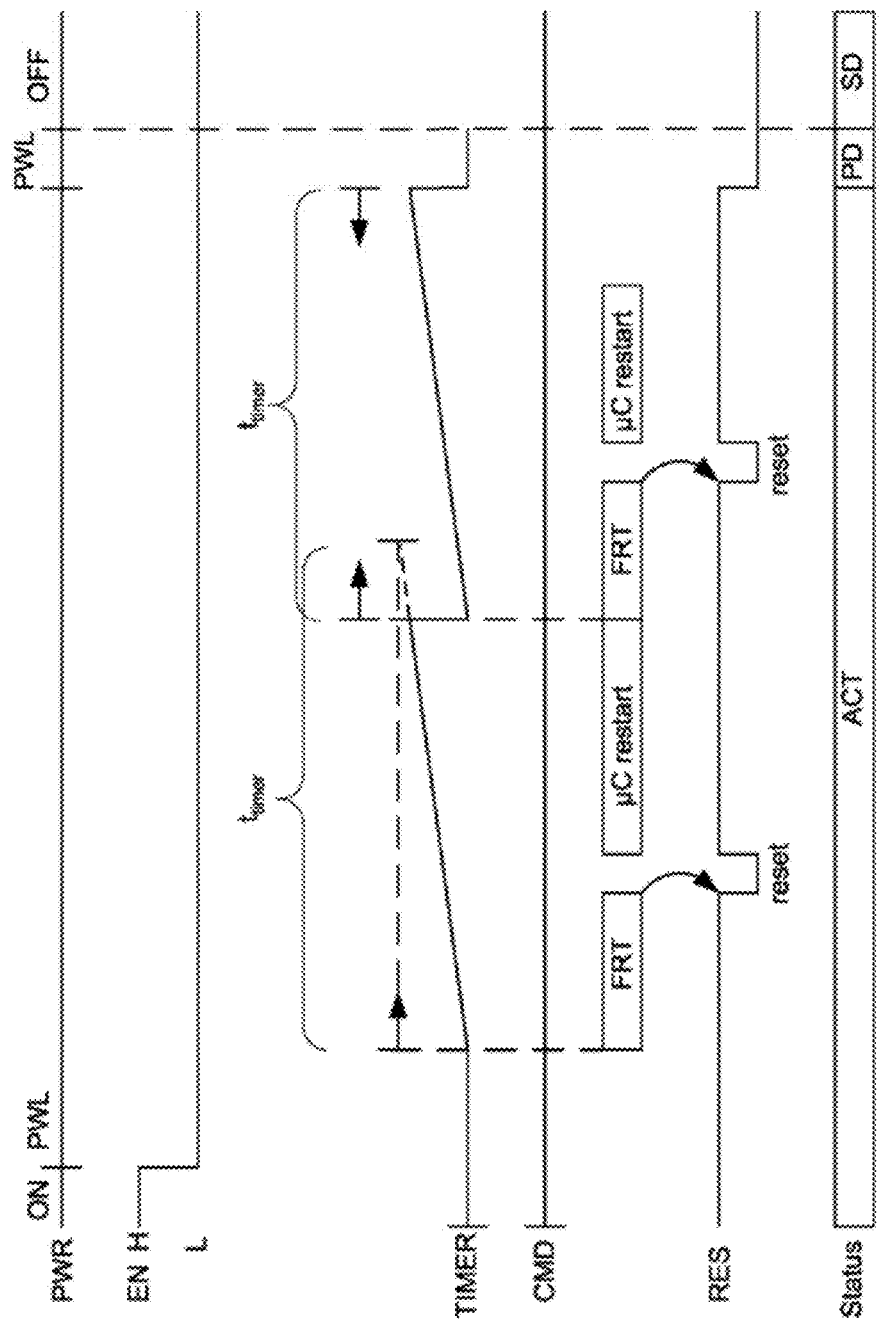
FIG. 2 shows a timing diagram illustrating the function of a device for operating an electronic system.

Upon receipt of the control command CMD, the power supply unit 10 starts a timer (FIG. 2: TIMER) of the duration $t_{timer}$, which can be stored in the power supply unit depending on the fault response tests to be carried out by the microcontroller 20. For example, a duration between a few hundred milliseconds and a few seconds may be provided. If the power supply unit 10 receives another control command CMD before the timer $t_{timer}$ expires, the timer starts running again. If no further control command CMD has been received from the power supply unit 10 after the timer has expired or by the time the (last) timer $t_{timer}$ has expired, the power supply unit 10 (provided no trigger signal TRG is received) disables the supply voltage Vss at the power supply potential output 13. The status of the electronic system changes at this point from a status ACT (representing active) to a status PD (representing power down). After a further specified period of time has elapsed, the status can then change again to SD (representing shut down), in which the electronic system is off (PWR=OFF).

The receipt of the control command CMD can also be used by the control unit 17 to issue or suppress the control signal AS at the control signal output 18 to disable the switching unit 19.

FIG. 2 shows the procedure described above in a timing diagram. FIG. 2 shows, from top to bottom, the state PWR of the electronic system, the enable signal EN, the timer TIMER, the control command CMD, the enable signal RES, and the status of the electronic system. If the enable signal EN is logical "H", the components of the electronic system are supplied with power, i.e., PWR=ON, with the status=ACT (active). When the enable signal changes from logical "H" to logical "L", the system switches to the power-latch phase PWL. As a result, the microcontroller 20 transmits the cyclical trigger signal TRG. In order to be able to perform fault response tests, the microcontroller 20 also transmits a control command CMD which sets the timer TIMER in motion. The fault response test FRT ends with a reset, RES=reset, which causes the microcontroller 20 to restart. As a result of the reset, the TRG trigger signal is no longer issued. Since the timer has not yet expired, the microcontroller 20 still continues to be supplied with the supply voltage Vss. Before the first timer expires, a further fault response test FRT is performed with a final reset, RES=reset. At the start of the new fault response test, the timer starts running again. As a result of the reset, the trigger signal TRG remains off for the time of the reset until the microcontroller has been completely restarted again (μC restart). After the timer has expired, the power-latch phase PWL is continued. When the microcontroller 20 stops the signal TRG, the electronic system changes its status from "active" (ACT) to power down (PD). After a certain period of time has elapsed, the electronic system is switched off (PWR=OFF). The status from this point on is "shut down" (SD).

A number of implementations have been described. Nevertheless, it will be understood that various modifications may be made without departing from the spirit and scope of the disclosure. Accordingly, other implementations are within the scope of the following claims.

What is claimed is:

1. A device for operating an electronic system of a vehicle, the device comprising:
   a power supply unit that, during operation, is supplied with a battery voltage on a first supply potential input connection and that provides a supply voltage on a supply potential output connection, the power supply unit includes an enable input via which the supply voltage on the supply potential output connection can be enabled and disabled by an enable signal, and a trigger signal input for receiving a trigger signal, the power supply unit is designed, in a power-latch phase of the electronic system in which the enable signal is not present, to provide the supply voltage upon receiving the trigger signal even when the enable signal is not present on the supply potential output connection; and
   a microcontroller that is supplied with the supply voltage on a second supply potential input connection when the enable signal is present on the enable input or when the microcontroller, in the power-latch phase, generates the trigger signal and transmits it to the trigger signal input, wherein the power supply unit, upon receiving a control command, suppresses deactivation of the supply voltage for supplying the microcontroller.

2. The device of claim 1, wherein the microcontroller issues the control command.

3. The device of claim 1, wherein the power supply unit suppresses the deactivation of the supply voltage for a specified time period since the receipt of the control command.

4. The device of claim 3, wherein the power supply unit restarts the specified time period since the receipt of a respective control command.

5. The device of claim 1, wherein the power supply unit suppresses the deactivation of the supply voltage for supplying the microcontroller after receiving the control command, independently of an absence of the trigger signal and/or independently of a received reset.

6. The device of claim 1, wherein the power supply unit suppresses the deactivation of the supply voltage for supplying the microcontroller after receiving the control command, even if no enable signal is present at the enable input.

7. The device of claim 1, wherein the microcontroller increments or decrements a counter by 1, starting from a specified counter start value, with each call of a control command, wherein if the counter has reached a specified counter end value, the control command is no longer issued.

8. The device of claim 1, wherein the microcontroller calls the control command once or cyclically or indefinitely.

9. The device of claim 1, wherein the power supply unit increments or decrements a counter by 1, starting from a given counter start value, upon each receipt of a control command, wherein if the counter has reached a specified counter end value, the deactivation of the supply voltage for supplying the microcontroller is not suppressed.

10. The device of claim 1, wherein the power supply unit comprises a control unit designed to generate, upon receipt of the control command, a control signal for a controllable switching unit connected to the first supply potential input connection for switching the battery voltage.

* * * * *